W. G. WAGENHALS.
TRACTOR.
APPLICATION FILED JAN. 26, 1916.

1,321,955.

Patented Nov. 18, 1919.
3 SHEETS—SHEET 2.

Witness
Chas. W. Stauffer
Arthur F. Draper

Inventor
William G. Wagenhals
By
Barthel & Barthel
Attorneys

W. G. WAGENHALS.
TRACTOR.
APPLICATION FILED JAN. 26, 1916.

1,321,955.

Patented Nov. 18, 1919.
3 SHEETS—SHEET 3.

Witness
Cha W. Stauffiger
Arthur F. Draper

Inventor
William G. Wagenhals,
By
Attorneys

UNITED STATES PATENT OFFICE.

WILLIAM G. WAGENHALS, OF DETROIT, MICHIGAN.

TRACTOR.

1,321,955.	Specification of Letters Patent.	Patented Nov. 18, 1919.

Application filed January 26, 1916. Serial No. 74,295.

*To all whom it may concern:*

Be it known that I, WILLIAM G. WAGENHALS, a citizen of the United States of America, residing at Detroit, in the county of Wayne and State of Michigan, have invented certain new and useful Improvements in Tractors, of which the following is a specification, reference being had therein to the accompanying drawings.

In the construction and operation of tractors, particularly for agricultural use, it is desirable that the center of gravity be kept as low as possible, that the tread be as narrow as consistent with stability and that the traction of the machine be so distributed as to tend to hold it to its work.

This invention relates to a tractor and to an arrangement thereof whereby great strength and stability is obtained, together with a narrow wheel base, and with such distribution of the strain from the drawn load, that the machine tends to hold on to the surface of the ground and thereby operate effectively.

The invention consists in the matters hereinafter set forth, and more particularly pointed out in the appended claims.

Figure 1:
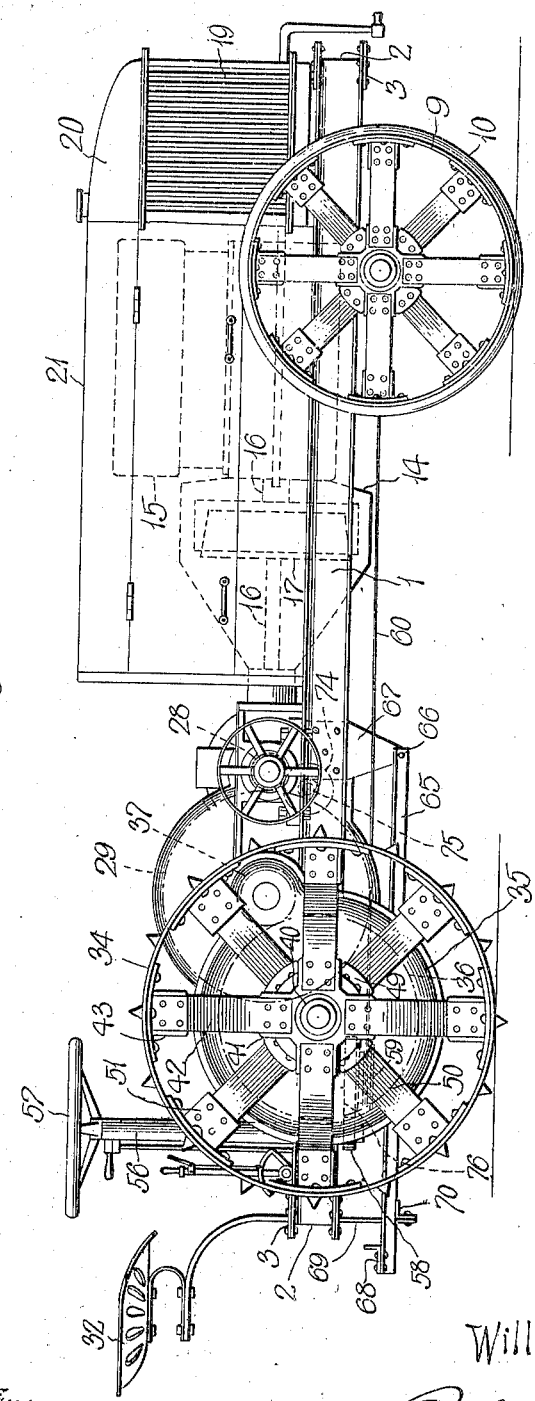
Figure 1 is a view in side elevation of a tractor that embodies features of the invention.
Figure 2:
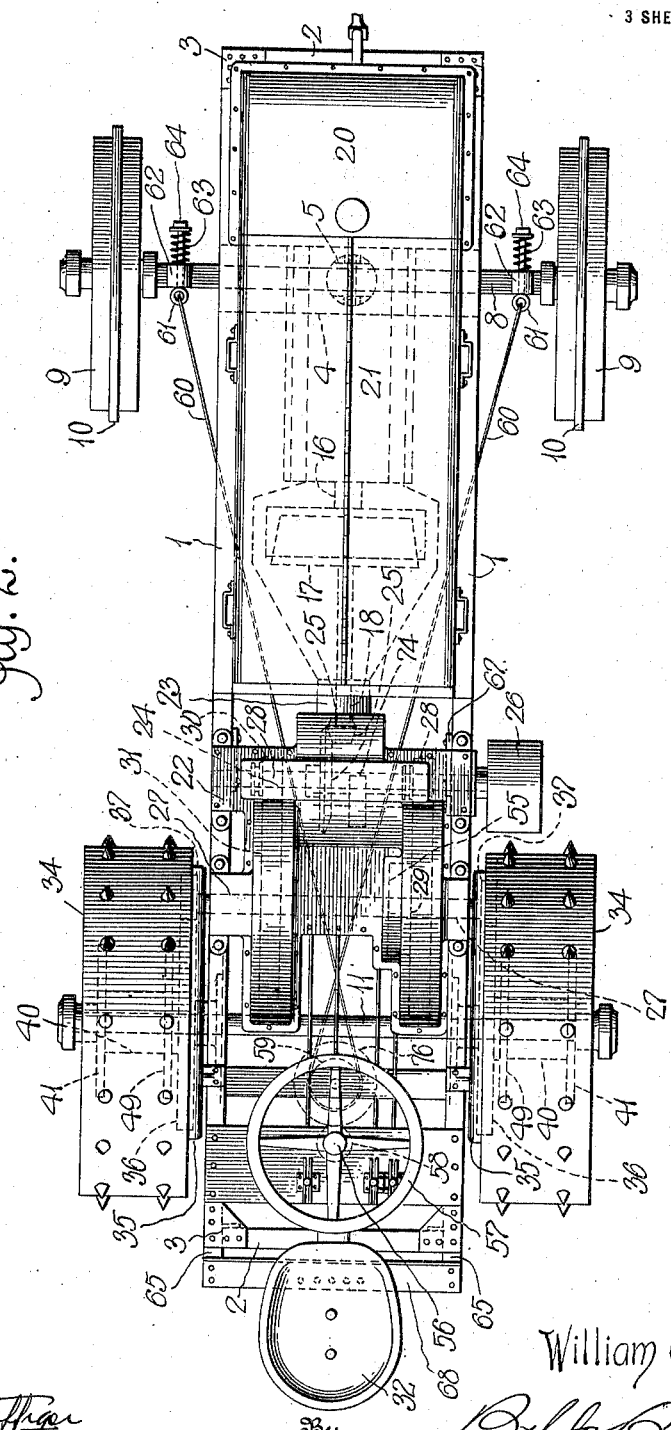
Fig. 2 is a plan view thereof.

Referring to the drawings, a rectangular frame formed of side channels 1 extending longitudinally of the machine with suitable front and rear transverse members 2, and angle plates 3, is supported on its forward end by a bolster 4 which is swiveled on a king pin bracket 5 which in turn rocks on a longitudinally disposed pintle 6. The latter moves in an underhung bearing 7 of a swiveled axle 8, on the skeins of which guide bearing wheels 9 are suitably journaled, being provided with the usual peripheral flanges 10 for effectively steering the machine.

Figure 4:
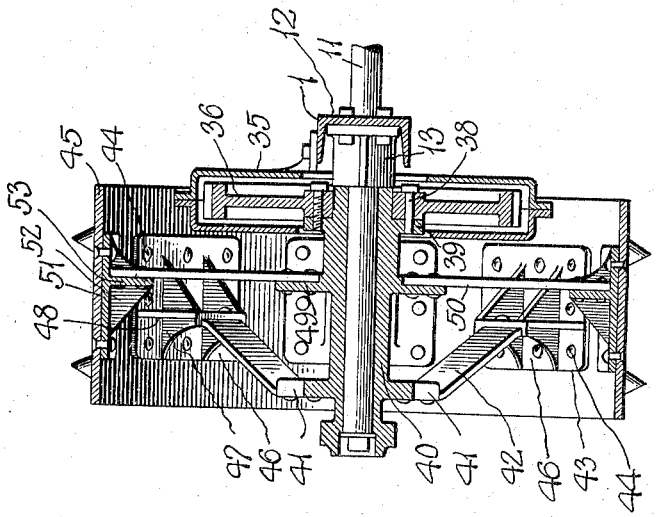
Fig. 4 is a view in section through a preferred form of traction bearing wheel.

Near the rear of the machine, a transverse shaft 11 extends through openings in the web 12 (see Fig. 4) of each side channel 1 and through suitable supporting members 13 bolted or otherwise secured to the frame.

A power plant 14 is bolted fixedly or otherwise made fast to the forward part of the frame and includes an explosive engine indicated at 15 of approved type with a rearwardly extending drive shaft 16 that is appropriately connected as by a clutch indicated diagrammatically at 17, and of any approved type, to a gear shaft 18. The plant is so housed as to form a rigid reinforcing member of the frame. A pair of oppositely disposed radiators 19 of approved type with water head 20 are mounted ahead of the power plant, the whole being appropriately covered by the usual hood 21.

An appropriately designed gear casing 22 conforming in contour to the gear train that may be used, is rigidly secured to the side members 1 of the frame with a forward bearing 23 for the shaft 18. A jack shaft 24 in this casing is driven directly from the shaft 18 by appropriate bevel gears, such as indicated at 25, worm drive or the like and carries on its outer end a pulley 26 for furnishing power when the tractor is stationary, for use in driving a threshing machine, saw mill or other like purposes.

A countershaft 27 mounted in the gear casing, is driven from the crank shaft by any preferred means. For example, high speed forward is obtained by a sliding pinion 28 on the jack shaft meshing with a corresponding gear 29 on the counter shaft. Similarly a slow speed slide pinion 30 meshes with a corresponding gear 31 on the countershaft. And if the pinion 28 be moved past neutral it meshes with a reverse intermediate pinion 74 which in turn drives through a follower pinion 75 underneath and in mesh with the gear 29. It is to be understood that suitable controlling members for these gears are mounted on the casing within reach of the operator whose station is at a suitable seat 34 appropriately mounted at the rear of the frame. Such controlling mechanism is not shown as the type of gear shift and reverse speed mechanism is not confined to the arrangement herein indicated.

A gear casing 35 on or over each axle support 13, houses a bull gear 36 that meshes with a bull pinion 37 on the end of the countershaft. The bull gear is connected appropriately to a traction bearing wheel represented generally at 34. It may be mounted on the wheel in the usual manner by connection with the spokes thereof, but in order to obtain the best results whereby strength and lightness of the traction wheel is gained, the bull gear is secured as by appropriate bolts 38 or the like to an annular flange 39 of a wheel hub 40. Pairs of radially disposed lugs 41 on the outer end of the wheel hubs that are recessed or channeled, receive flat spokes 42 of suitable sheet material, the outer end portions of which are made fast to rim brackets 43 secured by rivets 44 or the like to the inner periphery of a felly 45. Preferably the rim bracket includes a base plate 46 with a pair of inwardly extending braces 47 connected by a circumferentially disposed web member 48, the spokes 42 being secured against the web member between the braces 47. The spokes are of course appropriately dished. On the inner end portion or near the middle of the hub, a hub flange 49 that is slightly recessed for the end portions of a second set of spokes 50 is connected thereby to a second set of rim brackets 51 having the same general arrangement as the other brackets, with pairs of braces 52 and cross webs 53 to which the spokes are riveted. Because of this disposition of material in the spokes, the bull gear drives as readily from the hub of the wheel as if it were bolted directly to the spokes and permits of a lighter construction of the wheel.

A suitable brake drum 55 on the countershaft, is appropriately connected to the brake mechanism, not shown. An upright steering wheel shaft 56 with hand wheel 57 in front of the seat 32 carries a pinion 58 meshing with a drum gear 76 whereby a cable drum 59 controls a cable or like flexible connection 60 extending forward to the front axle 8 to which its extremities are connected by eye-bolts 61 longitudinally reciprocable in guide lugs 62 against the tension of springs 63 in compression between the lugs 62 and outer nuts 64 whereby the spring pressure may be varied.

A draft frame is so connected to the main frame as to counteract the tendency of the gearing between the traction wheel and the power plant to raise the front end of the machine.

In preferred form, this traction frame consists of a pair of angle bars 65, the forward end portions of each being pivoted as at 66 to depending hangers 67 of appropriate design that are secured against the underside of the longitudinal channels 1, between the traction bearing wheels and the forward drive wheels. A cross channel or angle bar 68 connects the rear end portion of the traction frame member 65, the frame embracing a pair of depending guide members 69 and being limited in downward movement by a suitable stop-bar 70.

As will be seen the location of hangers 67 is practically between the portions of greatest weight—the power plant located at the front of the tractor and the immediate drive mechanism at the rear portion—so as to bring the draft load approximately at the center of weight of the tractor. As a result, any tendency of the machine to "rear" backward in the presence of an obstruction to the implement being drawn, such as would be necessary to produce the "rearing" action, is prevented, since the load itself acts to oppose movement of the frame in the direction of "rearing". And this result is had without affecting the steering of the machine, the load being distributed rather than localized, so that there is practically no tendency of the structure to be thrown out of line by side draft.

Figure 5:
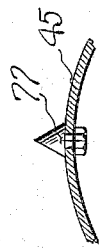
Fig. 5 is a view in detail of an adjustable spud or calk of the wheel.
Figure 3:
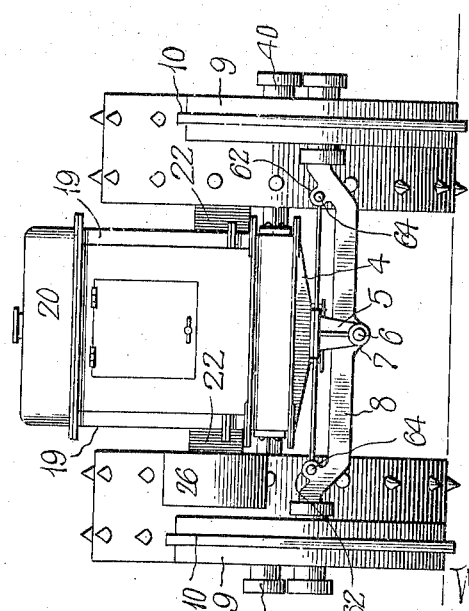
Fig. 3 is a view in front end elevation.

It is to be understood that the tread of the traction wheel may have squares or spuds or calks of suitable type dependent upon the surface to be traversed. Accordingly such calks are made removable and in the detail Fig. 5, one form is shown with screw-threaded shanks 72 extending through apertures in the wheel rim and having holding nuts 77.

Because of the narrow rectangular frame and the close relation between the unit power plant casing and the gear casing, great strength is combined with rigidity. Because of the narrow tread, it is not necessary to include a differential drive although such may be used if preferred. Because the traction frame is coupled to the main frame between its wheel supports and below the line connecting the axles thereof, any load that is imposed upon the tractor, tends to cause the latter to hug the ground and prevents the front of the machine from rising upwardly as it might under the influence of the pinions lying against the bull gears of the wheel.

Because of the construction of the traction wheels themselves, extreme lightness and rigidity is obtained. While the governing and controlling devices are not shown except diagrammatically, it is to be understood that they are present and that the necessary lubricating, cooling and ignition systems are provided for together with their appropriate controls.

Obviously, changes in the details of construction may be made without departing from the spirit of my invention, and I do not care to limit myself to the particular form of construction shown.

What I claim as my invention is:—

1. In a tractor having drive and steering wheels and a frame supported thereby, a power plant at the front of the frame, drive mechanism adjacent the drive wheels and including a gear and pinion for each drive wheel with the pinion axis above the plane of the frame, gearing axially alined with the pinions, and drive elements operatively connected with the gearing and having axes positioned in advance of the gearing axis and above the plane of the frame, drive connections between the power plant and the drive elements, and a draft bar structure supported by and below the frame and positioned to place its load pressure upon the frame approximately the center of weight of the tractor.

2. A tractor as in claim 1 characterized in that the draft bar is supported by hangers depending from the frame and positioned to locate the point of support on a vertical plane in advance of a drive element axis.

In testimony whereof I affix my signature in presence of two witnesses.

WILLIAM G. WAGENHALS.

Witnesses:
C. R. STICKNEY,
ANNA M. DORR.